(12) United States Patent
Peeters et al.

(10) Patent No.: US 7,756,217 B2
(45) Date of Patent: Jul. 13, 2010

(54) METHOD AND SYSTEM FOR A ROBUST INITIALIZATION SYMBOL FOR DIGITAL DUPLEXING

(75) Inventors: Miguel Peeters, Brussels (BE); Philippe Antoine, Walhain (BE); Geert Goris, Leuven (BE)

(73) Assignee: Broadcom Corporation, Irvine, CA (US)

( * ) Notice: Subject to any disclaimer, the term of this patent is extended or adjusted under 35 U.S.C. 154(b) by 1125 days.

(21) Appl. No.: 11/312,642

(22) Filed: Dec. 21, 2005

(65) Prior Publication Data

US 2006/0159192 A1 Jul. 20, 2006

Related U.S. Application Data

(60) Provisional application No. 60/637,661, filed on Dec. 21, 2004.

(51) Int. Cl.
*H04L 27/36* (2006.01)
(52) U.S. Cl. ........................................ 375/298; 375/261
(58) Field of Classification Search ......... 375/259–261, 375/295, 298; 370/203–204, 206
See application file for complete search history.

(56) References Cited

U.S. PATENT DOCUMENTS

| | | | |
|---|---|---|---|
| 6,731,695 B2 * | 5/2004 | Tzannes et al. ............. | 375/298 |
| 6,819,719 B2 * | 11/2004 | Schelstraete ................ | 375/262 |
| 6,891,792 B1 * | 5/2005 | Cimini et al. ............... | 370/206 |
| 6,963,622 B2 * | 11/2005 | Eroz et al. .................. | 375/298 |
| 7,075,999 B2 * | 7/2006 | Redfern ...................... | 375/260 |
| 7,139,322 B1 * | 11/2006 | Nergis ........................ | 375/260 |
| 7,286,617 B2 * | 10/2007 | Vanderperren et al. ...... | 375/343 |
| 2003/0198299 A1 * | 10/2003 | Redfern ...................... | 375/260 |

* cited by examiner

*Primary Examiner*—Jean B Corrielus
(74) *Attorney, Agent, or Firm*—Sterne, Kessler, Goldstein & Fox, P.L.L.C.

(57) ABSTRACT

Provided is a method and system for increasing cyclic prefix and cyclic suffix based upon a fast Fourier transform (FFT) and inverse fast Fourier transform (IFFT). The method includes representing at least one of the one or more DMT symbols in frequency domain to produce a frequency domain representation. The frequency domain representation corresponds to a quadrature amplitude modulation (QAM) constellation. Next the QAM constellation is rotated in the frequency domain by changing a characteristic of the DMT symbol as a function of tone index (k), cyclic extension length (CE), inverse fast fourier transform (IFFT) size (N), and pi. Finally, a number of extended symbols are produced to represent the DMT symbol based upon the rotating.

11 Claims, 5 Drawing Sheets

FIG. 3

METHOD AND SYSTEM FOR A ROBUST INITIALIZATION SYMBOL FOR DIGITAL DUPLEXING

CROSS-REFERENCE TO RELATED APPLICATIONS

This application claims the benefit of U.S. Provisional Application No. 60/637,661 filed Dec. 21, 2004, entitled "Method and System for Robust Initialization Symbol for Digital Duplexing," which is incorporated by reference herein in its entirety.

BACKGROUND OF THE INVENTION

1. Field of the Invention

The present invention relates generally to production of training signals with cyclic extension used during receiver/transmitter initialization.

2. Background Art

Very high speed digital subscriber loop (VDSL) systems provide the next generation of high speed networking technology over existing telephone line infrastructure. VDSL resolves many of the technical challenges confronting its predecessor systems, such as digital subscriber line (DSL), high bit-rate digital subscriber-line (HDSL), and asymmetric digital subscriber-line (ADSL) systems. For example, VDSL based systems can provide very high symmetric and asymmetric bandwidth, up to 65 mega bits-per-second (Mbps), on a single telephone wire pair. Bandwidths of this order are capable of accommodating many bandwidth intensive services, such as video on demand, high definition television (HDTV), and broadcast video, now being deployed by telecom service providers.

Discrete multi-tone (DMT), a multi-carrier modulation scheme, is one of the modulation techniques selected for use within VDSL systems. DMT is preferred by service providers, over other available modulation schemes, because of its performance, flexibility, and compatibility with existing infrastructure and systems. Regardless of the modulation scheme, however, several technical challenges confront transmitting these bandwidth intensive services over primarily copper lines.

Inter-symbol interference (ISI), caused by the overlap of data symbols in time at the receiver, and frequency dependent noise, in the form of echo, are two of the challenges that confront transmitting high bandwidth services over existing VDSL communications channels.

To avoid ISI, for example, cyclic extensions (e.g. cyclic prefix and cyclic suffix) are added to every DMT symbol prior to transmission. The occurrence of cyclic extensions, particularly during an initialization (i.e. startup) stage of DMT communications channels, is important within the context of DMT receivers and transmitters. Of particular concern within this context is the applicability of signals with cyclic extension during the initialization stage when only the first upstream band (US0) is available.

During the initialization stage, central office (CO) and customer transceivers make measurements of received signal amplitude and/or power which are used to set the automatic gain controls and to signal power cutback levels to the other transmitter. Measurements and calibrations during this stage will effect the operability of a communications channel during the remainder of a communications session.

Several problems have been identified that occur within conventional DMT systems during this initialization stage. By way of background, a source of one such problem is the signal structure requirement that is identified, for example, in the G.992.3 standard definition of a C/R-COMB signal. Here, three identical symbols are used, but without cyclic prefix, without cyclic suffix, and without windowing. This approach is inadequate for VDSL.

Another source is the STMicro ITU-T Contribution D-1015 Geneva April 2004. This source advocates production of a periodic signal only in a small part of the band, but does not modulate any data in this band. Therefore, on a long copper loop, for example, it is difficult to transmit data when the specifically required frequencies in this small part of the band might not be available. Since this approach cannot accommodate the modulation of data, it is not a suitable approach for eliminating challenges, such as ISI and echo, mentioned above.

What is needed, therefore, is a method and system to ameliorate the challenges of the conventional telecommunications systems noted above. More particularly, what is needed is a method and system for effectively increasing the cyclic prefix and cyclic suffix while using for example, implementations of fast Fourier transform (FFT) and inverse fast Fourier transform (IFFT).

BRIEF SUMMARY OF THE INVENTION

Consistent with the principles of the present invention as embodied and broadly described herein, the present invention includes a method for extending one or more discrete multi-tone (DMT) symbols configured to carry data. The method includes representing at least one of the one or more DMT symbols in frequency domain to produce a frequency domain representation. The frequency domain representation corresponds to a quadrature amplitude modulation (QAM) constellation. Next the QAM constellation is rotated in the frequency domain by changing a characteristic of the DMT symbol as a function of tone index (k), cyclic extension length (CE), inverse fast fourier transform (IFFT) size (N), and pi. Finally, a number of extended symbols are produced to represent the DMT symbol based upon the rotating.

Further features and advantages of the present invention as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and constitute part of the specification, illustrate embodiments of the present invention and, together with the general description given above and the detailed description of the embodiments given below, serve to explain the principles of the invention. In the drawings:

FIG. 3 is an illustration of an exemplary synchronization Tx/Rx with extended symbols in accordance with an embodiment of the present invention;

DETAILED DESCRIPTION OF THE INVENTION

Figure 1:
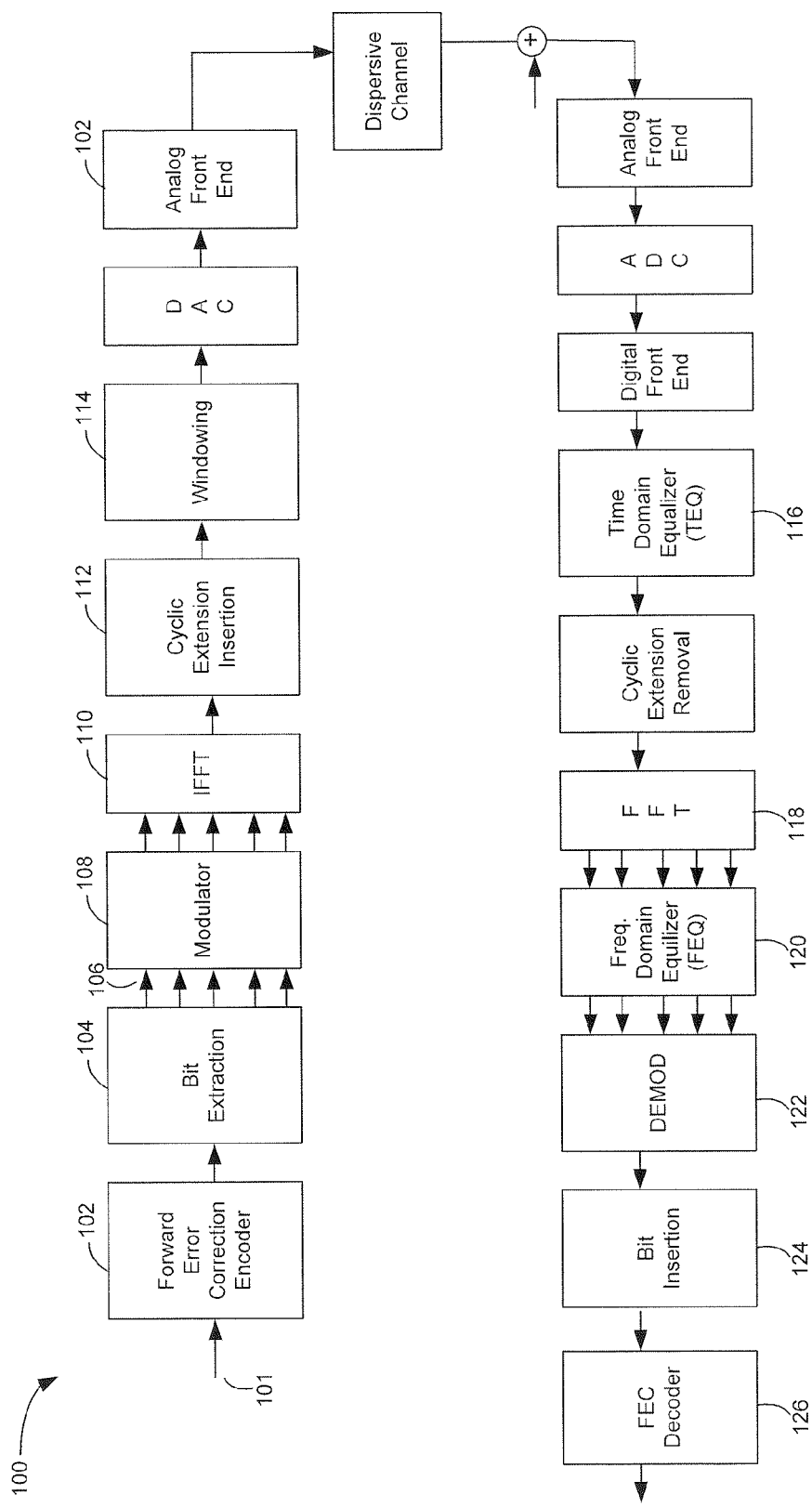
FIG. 1 is a block diagram of a discrete multi-tone (DMT) system configured and arranged in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

The present invention provides a method and system for effectively increasing the cyclic prefix and cyclic suffix without changing the basic FFT and IFFT implementations.

FIG. 1 is a block diagram illustration of an exemplary system 100 configured in accordance with an embodiment of the present invention. The system 100 includes a physical layer of a DMT modem. On the transmitter side, very high-speed data streams 101 are received as an input to an error correction encoder (e.g. Reed-Solomon) 102. A bit extraction device 104 divides the resulting stream into many lower speed data sub-streams 106. A modulator 108 modulates each sub-stream onto a carrier signal using, for example, quadrature amplitude modulation (QAM). By way of background, for DMT applications, the optimal size of the QAM constellations is determined during bit loading.

The carriers are transformed to a time domain signal using a module 110 that performs an inverse fast Fourier transform (IFFT) operation. A cyclic extender 112 is configured to insert a cyclic extension to the DMT symbol to reduce effects of channel dispersion. A windowing module 114 is provided to perform windowing operations to further reduce, for example, the interference into amateur radio band (HAM bands). A digital to analog converter (DAC) and an analog front end (AFE) convert a digital signal, output from the windowing module 114, to analog form for transmission.

On the receiver side, a receive AFE and an analog to digital converter (ADC) transfer the received signal from an analog signal to a digital signal expressed in time domain. The time domain signal is equalized using a time domain equalizer (TEQ) 116, and then converted back to the frequency domain using a fast Fourier transform (FFT) module 118. Each carrier is then individually equalized using a frequency domain equalizer (FEQ) 120 and demodulated and sliced within demodulator module 122. The outputs of the demodulator 120 are the bit sub-streams used as input to a bit insertion device 124 to produce a single very high-speed data stream that can be passed through, for example, a forward error correction decoder 126.

To eliminate most of the echo noise and ISI during the channel discovery phase (within initialization), the present invention modulates the same Special Operation Channel (SOC) byte on three consecutive DMT symbols. This process ensures a continuous transition between DMT symbols with the same SOC byte, and aligns roughly, at the VDSL transceiver unit receiver (VTU-R) side, the transition between DMT symbols with different SOC byte in the transmit and receive direction. This allows extending the cyclic prefix (CP) and cyclic suffix (CS) by one symbol at the cost of reducing the data rate by a factor of three.

In one exemplary embodiment of the present invention, one symbol is added before and after the symbol that has actual data. This approach allows an increase in the CP and CS by N+L_CP+L_CS samples, where N is the size of the IFFT used to generate the DMT symbol, L_CS is the length of the cyclic suffix, L_CP is the length of the cyclic prefix. This approach is implemented, however, by linearly rotating the constellation of the same symbol in the frequency domain.

Conventional systems, by contrast, only indicate how to generate a fully periodic sequence. That is, these conventional systems only accommodate a periodic sequence which prevents data transfer or symbol alignment by the loss of a symbol boundary marker in the sequence. The present invention, however, facilitates the transfer of data and allows symbol alignment by changing the symbol contents in a predetermined manner (e.g. every 3 symbols).

In the VDSL standard G.993.1, the first signal of an initialization at the VDSL transceiver unit at the CO (VTU-C) is called, for example, the O-Training signal. This O-Training signal is used to transmit data as well as to facilitate alignment of the transmit signal. A similar signal is sent by the VTU-C called an R-Training signal.

The main characteristics of the R-Training signal are (i) that even tones are not modulated (fixed 4 QAM constellation) from one symbol to the other, (ii) the odd tones are modulated every symbol by a different pattern called SOC data, and (iii) each symbol contains a cyclic prefix/suffix and windowing parameter (as specified in G.992.3). This use of the R-Training signal facilitates (a) data transfer, (b) probing of the channel, (c) synchronization of the VTU-R, and (d) alignment of the boundary of the VTU-R and the VDSL transceiver unit at an optical network unit (VTU-O).

However, if the VDSL system's wireline channel (e.g., copper loop) becomes long or low frequency bands are used, the CP and CS can become too short and can impair equalization as well as the echo canceling of the out-of-band signal generated by the sidelobes of transmit signal. The illustration of FIG. 2 includes an embodiment of the present invention that resolves this equalization dilemma.

Figure 2:
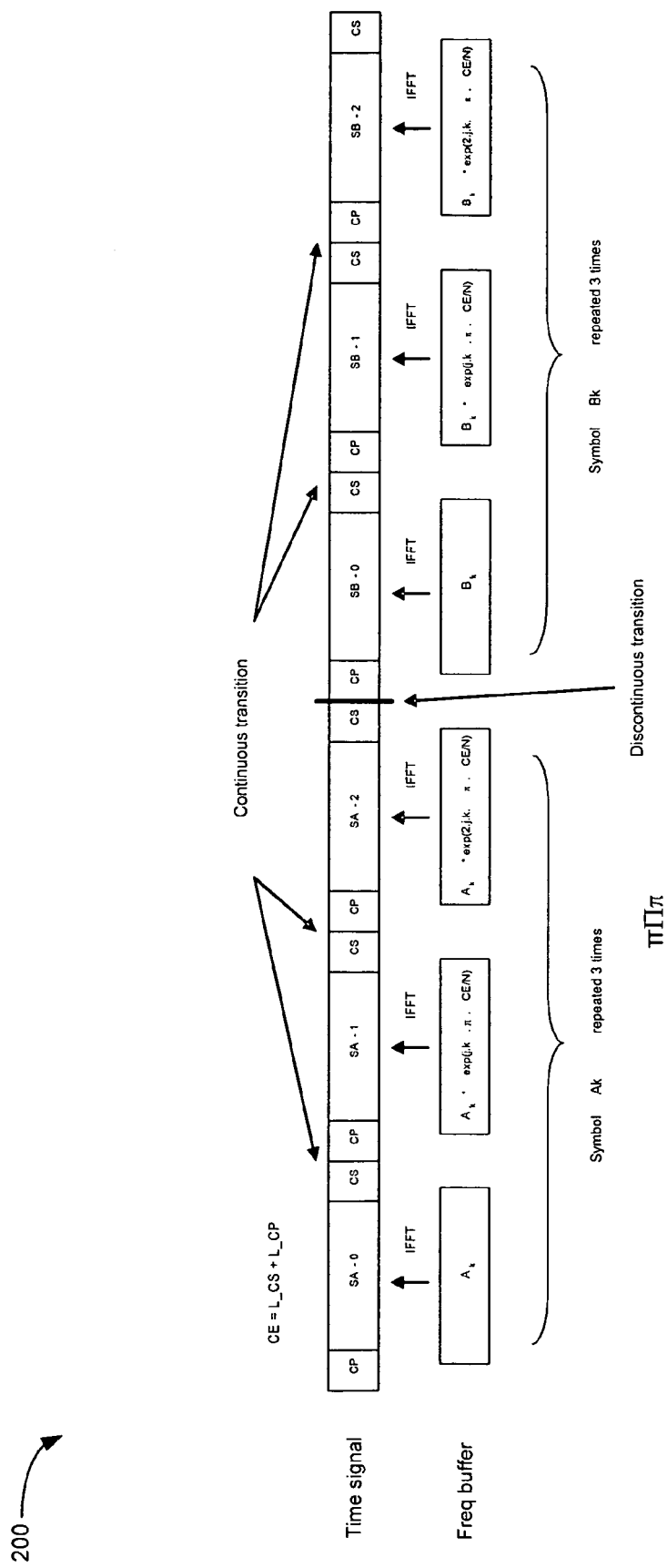
FIG. 2 is an illustration of an exemplary extended symbol format in accordance with an embodiment of the present invention.

FIG. 2 is an illustration of an exemplary extended symbol format 200 in accordance with the present invention, based upon the definitions and notations above. More specifically, an exemplary implementation of an extension with three symbols is shown in the extended symbol format 200 FIG. 2. Also, the extended symbol format 200 of FIG. 2 indicates how two different symbols with a frequency content Ak and Bk can be sent through a line.

In FIG. 2, for example, one extended symbol, e.g. SA, is made of three smaller DMT symbols, e.g. SA-0, SA-1, SA-2 for SA. In other words, FIG. 2 represents the modulation of the three DMT symbols containing a single SOC byte.

The first DMT symbol SA-0 will be modulated as an optical network unit remote (O/R)-P-TRAINING signals specified in the VDSL standard G.993.1. The first DMT symbol SA-0 is created by modulating on the tone with index k, the QAM symbol Ak. Each tone is modulated with a different QAM symbol Ak to form a set of N/2−1 complex value {Ak}. This set is input into the IFFT module 110 where N is the IFFT size.

The second DMT symbol SA-1 is a delayed version of SA-0 by a length of CE samples. This symbol can be generated by rotating the symbol in the frequency domain by a linearly increasing phase equal to $2*pi*k*CE/N$. In this case, therefore, the input to the IFFT module 110 for this second DMT symbol SA-1 would be a set of N/2−1 values $\{A_k \cdot e^{2\pi \cdot j \cdot k \cdot CE/N}\}$.

The third symbol SA-2 is generated by rotating the symbol Ak in the frequency domain with the angle 2*pi*k*2*CE/N. This third DMT symbol is a delayed version of SA-0 by 2*CE samples. Thus, for the third symbol SA-2, the input of the IFFT module 110 is a set of N/2−1 values $\{A_k \cdot e^{2\pi \cdot j \cdot k \cdot 2 \cdot CE/N}\}$.

The symbols SB-0, SB-1, SB-2 are constructed in the manner of the symbols SA-0, SA-1, SA-2, but with the DMT contents Bk instead of Ak.

With transformations from expressions of SA-0, SA-1, and SA-2, the transition between the three DMT symbols is continuous if Lwin windowing coefficients, within the IFFT module 110, are linked by the relationship w(Lwin−1−k)=w(k) for k=0, . . . , Lwin−1 and Lwin is an even integer.

In the exemplary embodiment of the present invention as illustrated in FIG. 2, to ensure a continuous transition between the DMT symbols containing the same SOC byte, it is desirable to rotate a target symbol (i.e., its associated QAM constellation (not shown)) by a phase increasing linearly with the frequency. This rotation emulates a pure delay of the DMT symbol by the cyclic extension length, CE samples. Specific techniques for rotating QAM constellations, for example, are well known to those of skill in the art. By way of background, however, one exemplary technique for performing this constellation rotation is by rotating the input to the IFFT module 110.

It could also be noted that symbols should be extended with the same number of symbols in both directions (upstream and downstream) in order to keep a robust digital duplexing. In this case the transmit and receive symbols must be synchronized such that the extended symbol transition in both directions is aligned in less than a DMT symbol period (N samples).

The present invention can be used, for example, to improve the SOC transfer while reducing the data rate, one byte every three symbols instead of one byte every symbol. It can also be used in other sequences of the initialization process where the odd tones are not modulated by data but by a predefined sequence or where the even tones are modulated too.

As noted previously, the present invention increases the cyclic prefix and cyclic suffix while using an effective implementation of the FFT/IFFT engine with cyclic prefix, suffix, and windowing.

Assume the following example periodic pattern will be transmitted:

$$p(n) = \sum_{K=1}^{N-1} P(K) \cdot e^{j \frac{2\pi \cdot K}{2N} n}$$

Here, for example, N is the number of tones, p(n) is the periodic pattern in the time domain (n—is the time index), and P(K) is the periodic pattern in the frequency domain (K—is the frequency index). Note that K is limited to 0. . . N−1, while n can assume any integer value. Note that the FFT Length is 2N. Also note that the time pattern p(n) is simply a set of exponents that rotate in a multiple of 2π each period of 1/Δf.

Next, to transmit the pattern P(K) each symbol, using cyclic extension, the fact that the IFFT length is 1/Δf assures that the pattern will rotate during FFT length, however it would not rotate along cyclic extension. The following is the signal generated by transmitting P(K) without compensating for no rotation along the cyclic extension, i.e. by using the standard VDSL transmitter using window w(n)

$$p(n) = \sum_{S=-\infty}^{\infty} w(n - S \cdot (2N + CE)) \cdot \sum_{K=1}^{N-1} P(K) \cdot e^{j \frac{2\pi \cdot K}{2N}(n - S \cdot (2N + CE))}$$

To rotate the periodic pattern p(n) in the above expression, each tone will be rotated according to its accumulated phase rotation, i.e. according to its frequency—along the cyclic extension of all of the previous symbols.

The additional term $$e^{j \frac{2\pi \cdot K}{2N} S \cdot CE}$$

in the expression below is, for example, the amount of rotation needed for tone K after S symbols if using cycle extension CE with number of tones N.

$$p(n) = \sum_{S=-\infty}^{\infty} w(n - S \cdot (2N + CE)) \cdot \sum_{K=1}^{N-1} \left[ e^{j \frac{2\pi \cdot K}{2N} S \cdot CE} \cdot P(K) \right] \cdot e^{j \frac{2\pi \cdot K}{2N}(n - S \cdot (2N + CE))}$$

Thus we get $$p(n) = \sum_{S=-\infty}^{\infty} w(n - S \cdot (2N + CE)) \cdot \sum_{K=1}^{N-1} [P(K)] \cdot e^{j \frac{2\pi \cdot K}{2N}(n - S \cdot (2N + CE)) + j \frac{2\pi \cdot K}{2N} S \cdot CE} =$$

$$\sum_{S=-\infty}^{\infty} w(n - S \cdot (2N + CE)) \cdot \sum_{K=1}^{N-1} [P(K)] \cdot e^{j \frac{2\pi \cdot K}{2N}(n - S \cdot (2N + CE) + S \cdot CE)} =$$

$$\sum_{S=-\infty}^{\infty} w(n - S \cdot (2N + CE)) \cdot \sum_{K=1}^{N-1} [P(K)] \cdot e^{j \frac{2\pi \cdot K}{2N}(n - S \cdot 2N)} =$$

$$\sum_{S=-\infty}^{\infty} w(n - S \cdot (2N + CE)) \cdot \sum_{K=1}^{N-1} [P(K)] \cdot e^{j \frac{2\pi \cdot K}{2N} n} =$$

The signal within the inner sum is independent of S, such that summations can be swapped. Thus, the following expression is produced:

$$p(n) = \left[ \sum_{K=1}^{N-1} P(K) e^{j \frac{2\pi \cdot K}{2N} n} \right] \cdot \left[ \sum_{S=-\infty}^{\infty} w(n - S \cdot (2N + CE)) \right]$$

Thus to get a periodic signal, with period being 2N (Which is exactly the FFT Length), the following is needed $$\sum_{S=-\infty}^{\infty} w(n - S \cdot (2N + CE))$$

to be constant in time. This property is shared by many useful windows e.g. linear window, cosine window, and brickwall window (latter is used for ADSL).

Figure 3:
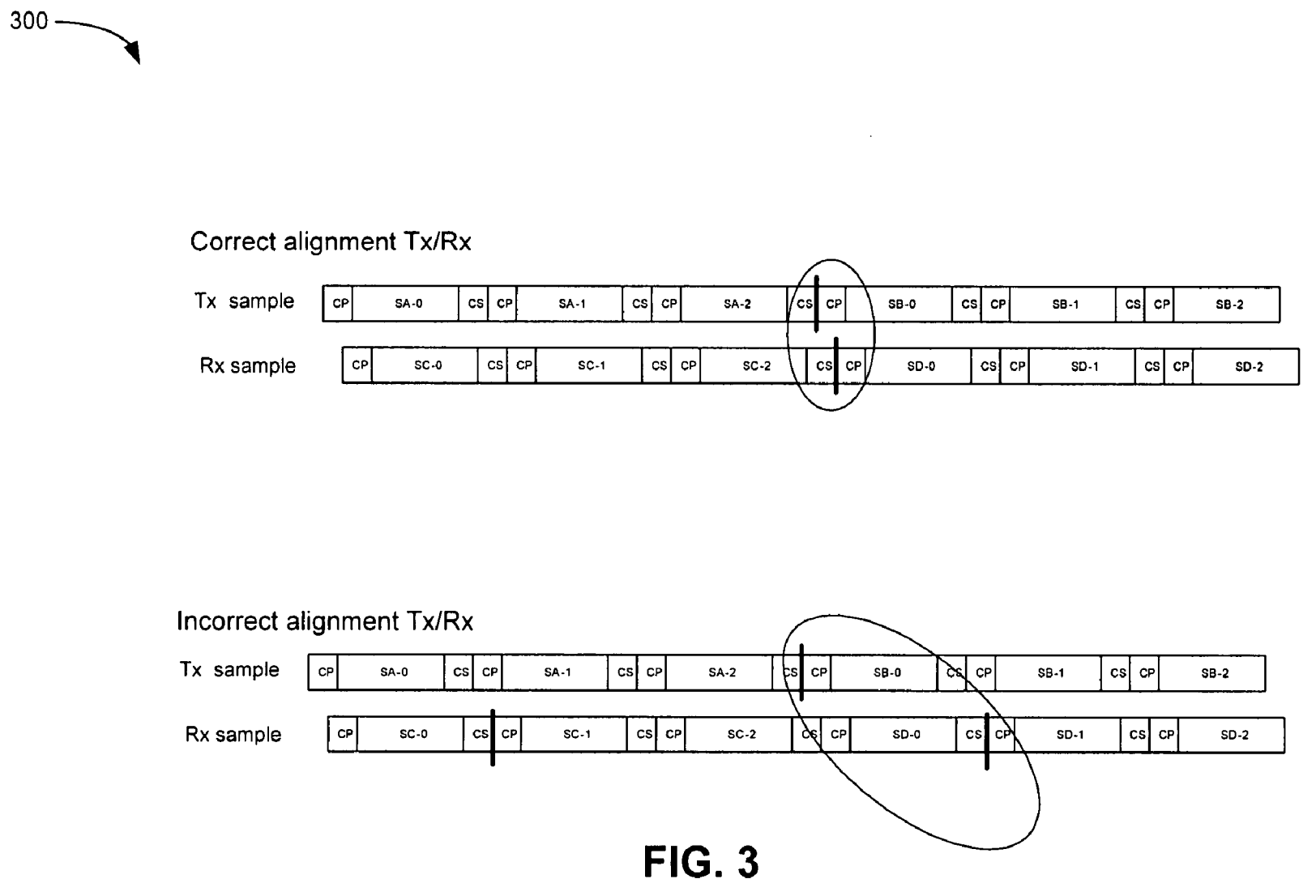

FIG. 3 is an illustration of an exemplary alignment technique 300 for synchronizing transmission and receive samples of the extended symbols SA-0 to SA-3 discussed above, in accordance with an embodiment of the present invention. The exemplary alignment technique 300 represents one tactic for canceling echo and can be performed within the VTU-R.

The alignment technique 300 must be performed on the discontinuous transitions to allow reasonably adequate echo canceling. Alignment can be accomplished, for example, by performing the FFT within the FFT module 118 in such a way that the echo for the tones is periodic for the full length of the FFT. The requirement on the alignment, within the VTU-R, is around half a DMT symbol. If messages are transmitted, for example, in the transceiver during training phase, the VTU-O and the VTU-R can choose to fall back to the SOC modulation technique of the G.993.1 standard if US0 is not the single usable upstream band.

The present invention can be used with CE, without CE, or without windowing, or without CE and windowing. Also, the number of symbols for the extension can be negotiated by the receiver and transmitter, e.g. during a handshake phase.

Figure 4:
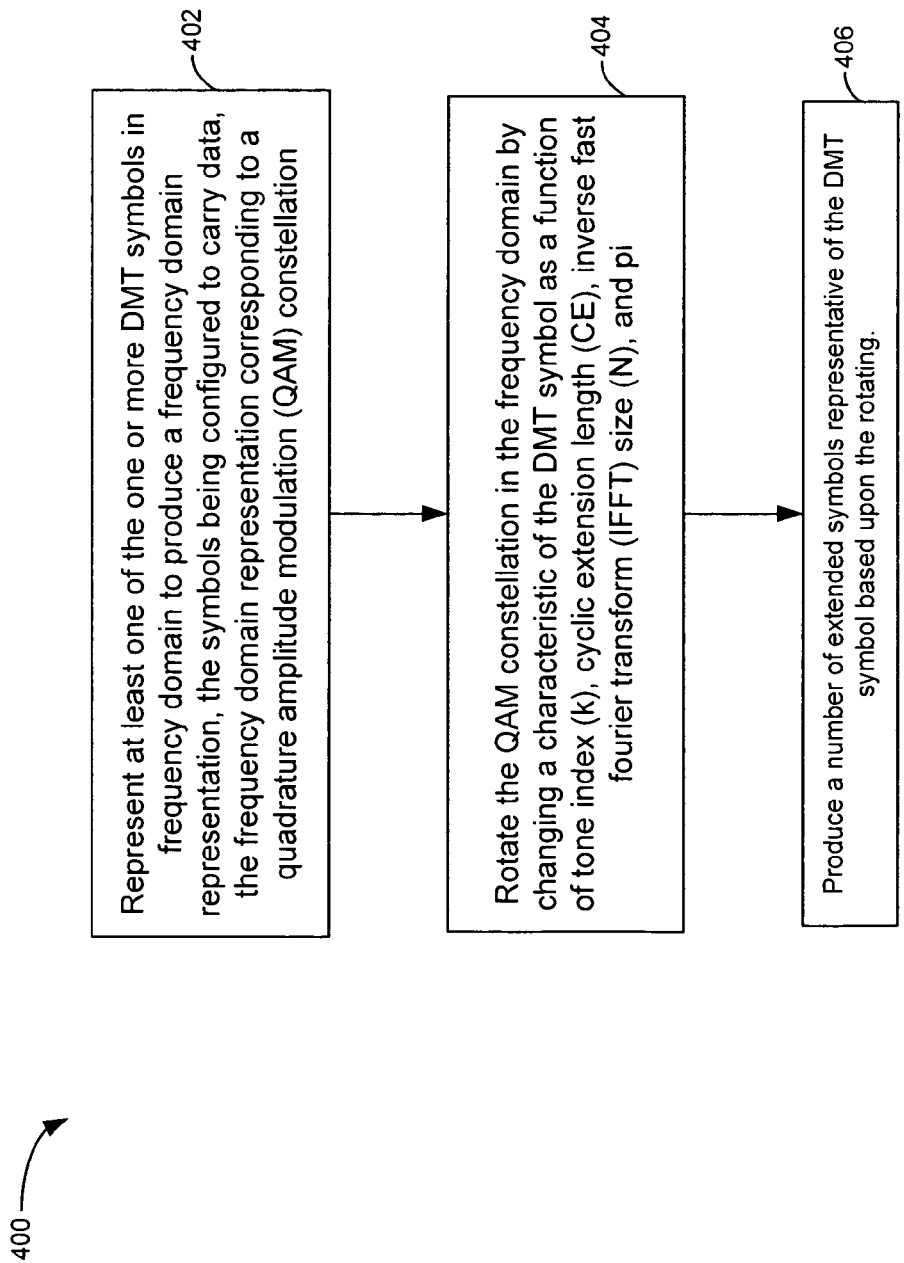
FIG. 4 is a flow diagram of an exemplary method of practicing an embodiment of the present invention.

FIG. 4 is a flow diagram of an exemplary method 400 of practicing an embodiment of the present invention. In the method 400, one or more DMT symbols configured to carry data is expressed in frequency domain to produce a frequency domain representation as illustrated in step 402. The frequency domain representation corresponds to a QAM constellation. In step 404, the QAM constellation is rotated in the frequency domain by changing a characteristic of the DMT symbol as a function of tone index (k), CE, IFFT size (N), and pi. A number of symbols is produced that collectively represents the extended DMT symbol, as shown in step 406. The production of the symbols is based upon the rotating of step 404.

Figure 5:
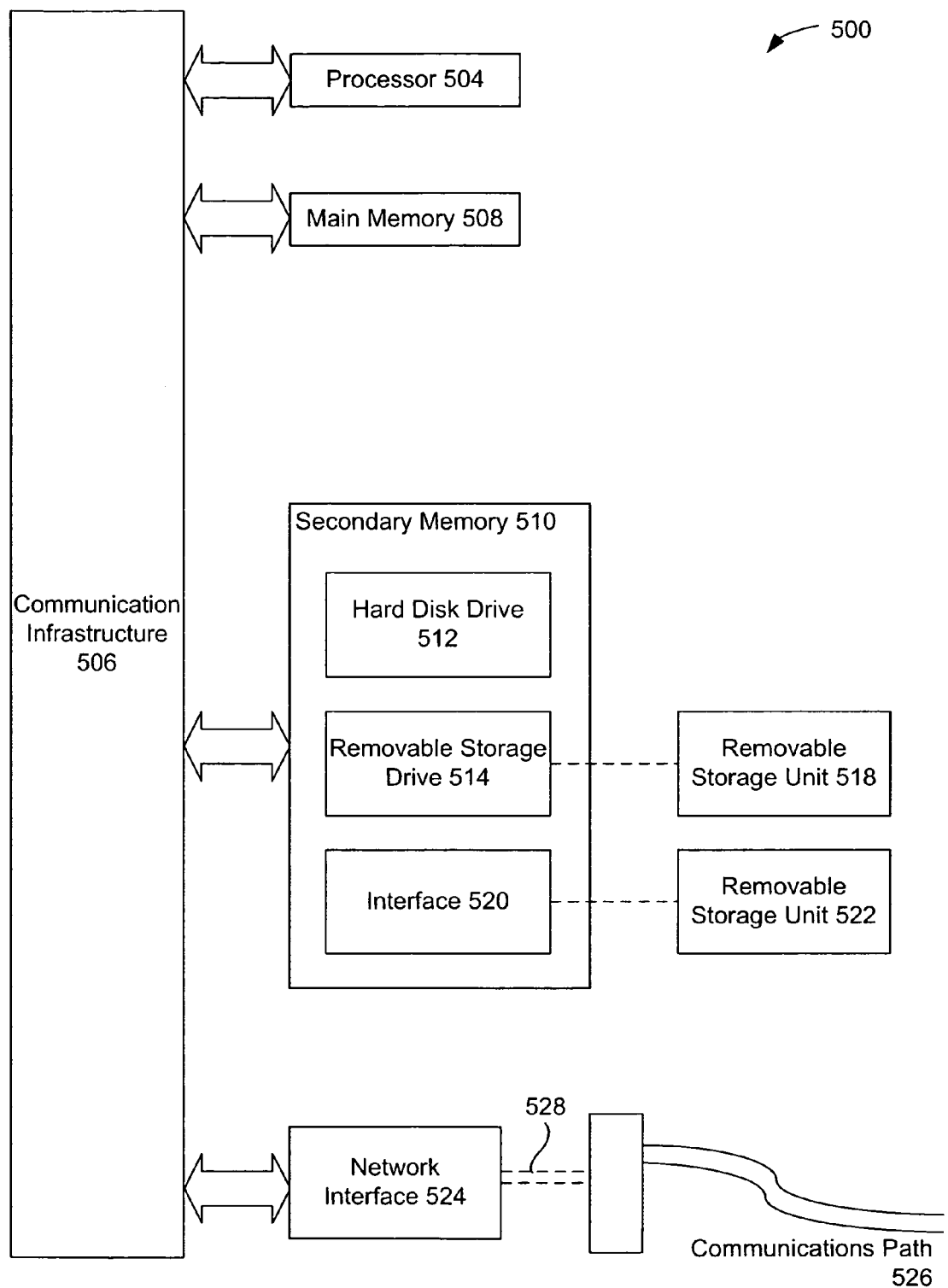
FIG. 5 is a block diagram of an exemplary computer system on which the present invention can be practiced.

As stated above, the present invention can be implemented in hardware, or as a combination of software and hardware. Consequently, the invention may be implemented in the environment of a computer system or other processing system. An example of such a computer system 500 is shown in FIG. 5.

The computer system 500 includes one or more processors, such as a processor 504. The processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the invention using other computer systems and/or computer architectures.

The computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. The removable storage unit 518, represents a floppy disk, magnetic tape, optical disk, etc. which is read by and written to by removable storage drive 514. As will be appreciated, the removable storage unit 518 includes a tangible computer readable storage medium having stored therein computer software and/or data.

In alternative implementations, the secondary memory 510 may include other similar means for allowing computer programs or other instructions to be loaded into the computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and the other removable storage units 522 and the interfaces 520 which allow software and data to be transferred from the removable storage unit 522 to the computer system 500.

The computer system 500 may also include a communications interface 524. The communications interface 524 allows software and data to be transferred between the computer system 500 and external devices. Examples of the communications interface 524 may include a modem, a network interface (such as an Ethernet card), a communications port, a PCMCIA slot and card, etc. Software and data transferred via the communications interface 524 are in the form of signals 528 which may be electronic, electromagnetic, optical or other signals capable of being received by the communications interface 524. These signals 528 are provided to the communications interface 524 via a communications path 526. The communications path 526 carries the signals 528 and may be implemented using wire or cable, fiber optics, a phone line, a cellular phone link, an RF link and other communications channels.

In the present application, the terms "computer readable medium" and "computer usable medium" are used to generally refer to media such as the removable storage drive 514, a hard disk installed in the hard disk drive 512, and the signals 528. These computer program products are means for providing software to the computer system 500.

Computer programs (also called computer control logic) are stored in the main memory 508 and/or the secondary memory 510. Computer programs may also be received via the communications interface 524. Such computer programs, when executed, enable the computer system 500 to implement the present invention as discussed herein.

In particular, the computer programs, when executed, enable the processor 504 to implement the processes of the present invention. Accordingly, such computer programs represent controllers of the computer system 500. By way of example, in the embodiments of the invention, the processes/methods performed by signal processing blocks of encoders and/or decoders can be performed by computer control logic. Where the invention is implemented using software, the software may be stored in a computer program product and loaded into the computer system 500 using the removable storage drive 514, the hard drive 512 or the communications interface 524.

CONCLUSION

The present invention provides an approach whereby working with US0 and cyclic extension startup is feasible, facilitating the agreement on startup with cyclic extension.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The Detailed Description section should primarily be used to interpret the claims. The Summary and Abstract sections may set forth one or more, but not all exemplary embodiments of the present invention as contemplated by the inventor(s), and thus, are not intended to limit the claims.

What is claimed is:

1. A method for a discrete multi-tone system configured and arranged to extend one or more discrete multi-tone (DMT) symbols configured to carry data, comprising:
   representing at least one of the one or more DMT symbols in frequency domain to produce a frequency domain representation, the frequency domain representation corresponding to a quadrature amplitude modulation (QAM) constellation;
   rotating the QAM constellation in the frequency domain by changing a characteristic of the DMT symbol as a function of tone index (k), cyclic extension length (CE), inverse fast fourier transform (IFFT) size (N), and pi; and
   producing a number of extended symbols representative of the DMT symbol based upon the rotating, the producing being performed within the discrete multi-tone system.

2. The method of claim 1, wherein the one or more symbols include at least one upstream symbol and at least one downstream symbol.

3. The method of claim 1, wherein a length of upstream extensions substantially equals a length of downstream extensions.

4. The method of claim 3, wherein the upstream and the downstream extensions are aligned with each other within less than or equal to one DMT symbol length.

5. The method of claim 1, wherein a phase of the rotation is linearly increasing with the tone index (k).

6. The method of claim 5, wherein the characteristic is phase of rotation of the DMT symbol.

7. The method of claim 5, wherein the number of extended symbols includes three DMT symbols.

8. The method of claim 7, wherein a first of the extended symbols is a delayed version of -CE samples of the DMT symbol, a second of the extended symbols is not delayed, and a third of the extended symbols is a delayed version of CE samples of the DMT symbol.

9. The method of claim 7, wherein adjacent ones of the three DMT symbols are delayed from each other by CE samples.

10. A tangible computer readable storage medium carrying one or more sequences of one or more instructions for execution by one or more processors to perform a method for extending one or more discrete multi-tone (DMT) symbols configured to carry data, the one or more instructions when executed by the one or more processors, cause the one or more processors to perform the steps of:
    representing at least one of the one or more DMT symbols in frequency domain to produce a frequency domain representation, the frequency domain representation corresponding to a quadrature amplitude modulation (QAM) constellation;
    rotating the QAM constellation in the frequency domain by changing a characteristic of the DMT symbol as a function of tone index (k), cyclic extension length (CE), inverse fast fourier transform (IFFT) size (N), and pi; and
    producing a number of extended symbols representative of the DMT symbol based upon the rotating.

11. The tangible computer readable storage medium of claim 10, wherein the one or more symbols include at least one upstream symbol and at least one downstream symbol.

* * * * *